(12) United States Patent
Yedid et al.

(10) Patent No.: US 11,675,155 B2
(45) Date of Patent: Jun. 13, 2023

(54) SPACER DESIGN FOR MITIGATING STRAY LIGHT

(71) Applicant: Corephotonics Ltd., Tel-Aviv (IL)

(72) Inventors: Itay Yedid, Tel Aviv (IL); Ephraim Goldenberg, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/715,249

(22) Filed: Apr. 7, 2022

(65) Prior Publication Data
US 2022/0229262 A1 Jul. 21, 2022

Related U.S. Application Data

(63) Continuation of application No. 16/975,718, filed as application No. PCT/IB2019/051643 on Mar. 1, 2019, now Pat. No. 11,333,845.

(60) Provisional application No. 62/637,451, filed on Mar. 2, 2018.

(51) Int. Cl.
*G02B 7/02* (2021.01)
*H04N 23/55* (2023.01)
*G02B 3/04* (2006.01)

(52) U.S. Cl.
CPC ............. *G02B 7/021* (2013.01); *H04N 23/55* (2023.01); *G02B 3/04* (2013.01)

(58) Field of Classification Search
CPC ...... G02B 7/021; G02B 3/04; G02B 27/0018; G02B 7/20; G02B 7/026; H04N 5/2254; H04N 5/2257
See application file for complete search history.

(56) References Cited

U.S. PATENT DOCUMENTS

| | | | |
|---|---|---|---|
| 2,106,752 | A | 2/1938 | Land |
| 2,354,503 | A | 7/1944 | Arthur |
| 2,378,170 | A | 6/1945 | Aklin |
| 2,441,093 | A | 5/1948 | Aklin |
| 3,388,956 | A | 6/1968 | Eggert et al. |
| 3,524,700 | A | 8/1970 | Eggert et al. |
| 3,558,218 | A | 1/1971 | Grey |

(Continued)

FOREIGN PATENT DOCUMENTS

| | | |
|---|---|---|
| CN | 102193162 A | 9/2011 |
| CN | 102147519 B | 1/2013 |

(Continued)

OTHER PUBLICATIONS

A compact and cost effective design for cell phone zoom lens, Chang et al., Sep. 2007, 8 pages.

(Continued)

*Primary Examiner* — Chiawei Chen
(74) *Attorney, Agent, or Firm* — Nathan & Associates; Menachem Nathan

(57) ABSTRACT

Spacers for separating a first lens element from a second lens element, lens modules including such spacers and digital cameras including such lens modules. A spacer may comprising along its perimeter at least one contact section being in contact with the first lens element and the second lens element and at least one non-contact section being separated from the first lens element. The at least one non-contact section comprises an internal inclined surface having designed to reduce or mitigate stray light.

18 Claims, 4 Drawing Sheets

(56) References Cited

U.S. PATENT DOCUMENTS

| | | | |
|---|---|---|---|
| 3,864,027 A | 2/1975 | Harada | |
| 3,942,876 A | 3/1976 | Betensky | |
| 4,134,645 A | 1/1979 | Sugiyama et al. | |
| 4,338,001 A | 7/1982 | Matsui | |
| 4,465,345 A | 8/1984 | Yazawa | |
| 5,000,551 A | 3/1991 | Shibayama | |
| 5,969,869 A | 10/1999 | Hirai et al. | |
| 6,147,702 A | 11/2000 | Smith | |
| 6,169,636 B1 | 1/2001 | Kreitzer | |
| 6,654,180 B2 | 11/2003 | Ori | |
| 7,187,504 B2 | 3/2007 | Horiuchi | |
| 7,206,136 B2 | 4/2007 | Labaziewicz et al. | |
| 7,515,351 B2 | 4/2009 | Chen et al. | |
| 7,564,635 B1 | 7/2009 | Tang | |
| 7,643,225 B1 | 1/2010 | Tsai | |
| 7,660,049 B2 | 2/2010 | Tang | |
| 7,684,128 B2 | 3/2010 | Tang | |
| 7,688,523 B2 | 3/2010 | Sano | |
| 7,692,877 B2 | 4/2010 | Tang et al. | |
| 7,697,220 B2 | 4/2010 | Iyama | |
| 7,738,186 B2 | 6/2010 | Chen et al. | |
| 7,777,972 B1 | 8/2010 | Chen et al. | |
| 7,813,057 B2 | 10/2010 | Lin | |
| 7,821,724 B2 | 10/2010 | Tang et al. | |
| 7,826,149 B2 | 11/2010 | Tang et al. | |
| 7,826,151 B2 | 11/2010 | Tsai | |
| 7,869,142 B2 | 1/2011 | Chen et al. | |
| 7,898,747 B2 | 3/2011 | Tang | |
| 7,916,401 B2 | 3/2011 | Chen et al. | |
| 7,918,398 B2 | 4/2011 | Li et al. | |
| 7,957,075 B2 | 6/2011 | Tang | |
| 7,957,076 B2 | 6/2011 | Tang | |
| 7,957,079 B2 | 6/2011 | Tang | |
| 7,961,406 B2 | 6/2011 | Tang et al. | |
| 8,000,031 B1 | 8/2011 | Tsai | |
| 8,004,777 B2 | 8/2011 | Souma | |
| 8,077,400 B2 | 12/2011 | Tang | |
| 8,149,523 B2 | 4/2012 | Ozaki | |
| 8,218,253 B2 | 7/2012 | Tang | |
| 8,228,622 B2 | 7/2012 | Tang | |
| 8,233,224 B2 | 7/2012 | Chen | |
| 8,253,843 B2 | 8/2012 | Lin | |
| 8,279,537 B2 | 10/2012 | Sato | |
| 8,363,337 B2 | 1/2013 | Tang et al. | |
| 8,395,851 B2 | 3/2013 | Tang et al. | |
| 8,400,717 B2 | 3/2013 | Chen et al. | |
| 8,451,549 B2 | 5/2013 | Yamanaka et al. | |
| 8,503,107 B2 | 8/2013 | Chen et al. | |
| 8,514,502 B2 | 8/2013 | Chen | |
| 8,570,668 B2 | 10/2013 | Takakubo et al. | |
| 8,718,458 B2 | 5/2014 | Okuda | |
| 8,780,465 B2 | 7/2014 | Chae | |
| 8,810,923 B2 | 8/2014 | Shinohara | |
| 8,854,745 B1 | 10/2014 | Chen | |
| 8,958,164 B2 | 2/2015 | Kwon et al. | |
| 9,185,291 B1 | 11/2015 | Shabtay | |
| 9,229,194 B2 | 1/2016 | Yoneyama et al. | |
| 9,235,036 B2 | 1/2016 | Kato et al. | |
| 9,279,957 B2 | 3/2016 | Kanda et al. | |
| 9,438,792 B2 | 9/2016 | Nakada et al. | |
| 9,488,802 B2 | 11/2016 | Chen et al. | |
| 9,568,712 B2 | 2/2017 | Dror et al. | |
| 9,678,310 B2 | 6/2017 | Iwasaki et al. | |
| 9,817,213 B2 | 11/2017 | Mercado | |
| 2002/0118471 A1 | 8/2002 | Imoto | |
| 2005/0041300 A1 | 2/2005 | Oshima et al. | |
| 2005/0062346 A1 | 3/2005 | Sasaki | |
| 2005/0128604 A1 | 6/2005 | Kuba | |
| 2005/0141103 A1 | 6/2005 | Nishina | |
| 2005/0168840 A1 | 8/2005 | Kobayashi et al. | |
| 2005/0270667 A1 | 12/2005 | Gurevich et al. | |
| 2007/0229983 A1 | 10/2007 | Saori | |
| 2008/0056698 A1 | 3/2008 | Lee et al. | |
| 2008/0304161 A1 | 12/2008 | Souma | |
| 2009/0002839 A1 | 1/2009 | Sato | |
| 2009/0122423 A1 | 5/2009 | Park et al. | |
| 2009/0141365 A1 | 6/2009 | Jannard et al. | |
| 2009/0225438 A1 | 9/2009 | Kubota | |
| 2009/0279191 A1* | 11/2009 | Yu | G02B 7/022 |
| | | | 359/819 |
| 2009/0303620 A1* | 12/2009 | Abe | G02B 7/021 |
| | | | 29/428 |
| 2010/0073531 A1* | 3/2010 | Yano | H04N 5/2257 |
| | | | 359/503 |
| 2010/0079635 A1* | 4/2010 | Yano | B29D 11/00307 |
| | | | 359/503 |
| 2010/0165476 A1 | 7/2010 | Eguchi | |
| 2010/0277813 A1 | 11/2010 | Ito | |
| 2011/0001838 A1 | 1/2011 | Lee | |
| 2011/0115965 A1 | 5/2011 | Engelhardt et al. | |
| 2011/0149119 A1 | 6/2011 | Matsui | |
| 2011/0157430 A1 | 6/2011 | Hosoya et al. | |
| 2011/0188121 A1 | 8/2011 | Goring et al. | |
| 2011/0249347 A1 | 10/2011 | Kubota | |
| 2012/0069455 A1 | 3/2012 | Lin et al. | |
| 2012/0092777 A1 | 4/2012 | Tochigi et al. | |
| 2012/0105708 A1 | 5/2012 | Hagiwara | |
| 2012/0154929 A1 | 6/2012 | Tsai et al. | |
| 2012/0194923 A1* | 8/2012 | Um | G02B 13/003 |
| | | | 359/793 |
| 2012/0229920 A1 | 9/2012 | Otsu et al. | |
| 2012/0262806 A1 | 10/2012 | Lin et al. | |
| 2013/0057971 A1 | 3/2013 | Zhao et al. | |
| 2013/0088788 A1 | 4/2013 | You | |
| 2013/0208178 A1 | 8/2013 | Park | |
| 2013/0279032 A1 | 10/2013 | Suigetsu et al. | |
| 2013/0286488 A1 | 10/2013 | Chae | |
| 2014/0022436 A1 | 1/2014 | Kim et al. | |
| 2014/0092487 A1 | 4/2014 | Chen et al. | |
| 2014/0146216 A1 | 5/2014 | Okumura | |
| 2014/0204480 A1 | 7/2014 | Jo et al. | |
| 2014/0285907 A1 | 9/2014 | Tang et al. | |
| 2014/0293453 A1 | 10/2014 | Ogino et al. | |
| 2014/0362274 A1 | 12/2014 | Christie et al. | |
| 2015/0116569 A1 | 4/2015 | Mercado | |
| 2015/0244942 A1 | 8/2015 | Shabtay et al. | |
| 2015/0253532 A1 | 9/2015 | Lin | |
| 2015/0253543 A1 | 9/2015 | Mercado | |
| 2015/0253647 A1 | 9/2015 | Mercado | |
| 2015/0373252 A1 | 12/2015 | Georgiev | |
| 2015/0373263 A1 | 12/2015 | Georgiev et al. | |
| 2016/0044250 A1 | 2/2016 | Shabtay et al. | |
| 2016/0062084 A1 | 3/2016 | Chen et al. | |
| 2016/0070088 A1 | 3/2016 | Koguchi | |
| 2016/0085089 A1 | 3/2016 | Mercado | |
| 2016/0182777 A1* | 6/2016 | Laroia | H04N 5/232 |
| | | | 348/374 |
| 2016/0187631 A1 | 6/2016 | Choi et al. | |
| 2016/0291295 A1 | 10/2016 | Shabtay | |
| 2016/0306161 A1 | 10/2016 | Harada et al. | |
| 2016/0313537 A1 | 10/2016 | Mercado | |
| 2016/0341931 A1 | 11/2016 | Liu et al. | |
| 2016/0353008 A1 | 12/2016 | Osborne | |
| 2017/0102522 A1 | 4/2017 | Jo | |
| 2017/0115471 A1 | 4/2017 | Shinohara | |
| 2017/0160511 A1 | 6/2017 | Kim et al. | |
| 2017/0299946 A1* | 10/2017 | Lai | G03B 17/12 |
| 2018/0024310 A1* | 1/2018 | Ma | G02B 5/005 |
| | | | 359/740 |
| 2018/0059365 A1 | 3/2018 | Bone et al. | |
| 2018/0113301 A1* | 4/2018 | Kim | G02B 5/003 |
| 2018/0164534 A1* | 6/2018 | Wei | G02B 7/021 |
| 2018/0217475 A1 | 8/2018 | Goldenberg et al. | |
| 2018/0224630 A1 | 8/2018 | Lee et al. | |
| 2019/0170965 A1 | 6/2019 | Shabtay et al. | |

FOREIGN PATENT DOCUMENTS

| | | |
|---|---|---|
| CN | 104297906 A | 1/2015 |
| CN | 105467563 A | 4/2016 |
| JP | S54157620 A | 12/1979 |
| JP | S59121015 A | 7/1984 |
| JP | 6165212 A | 4/1986 |

(56) References Cited

FOREIGN PATENT DOCUMENTS

| | | |
|---|---|---|
| JP | S6370211 A | 3/1988 |
| JP | 406059195 A | 3/1994 |
| JP | 2007133096 A | 5/2007 |
| JP | 2007219199 A | 8/2007 |
| JP | 2007306282 A | 11/2007 |
| JP | 2010164841 A | 7/2010 |
| JP | 2012203234 A | 10/2012 |
| JP | 2013105049 A | 5/2013 |
| JP | 2013106289 A | 5/2013 |
| JP | 2014142542 A | 8/2014 |
| KR | 20090131805 A | 12/2009 |
| KR | 20140135909 A | 5/2013 |
| KR | 20140023552 A | 2/2014 |
| WO | 2013058111 A1 | 4/2013 |
| WO | 2013063097 A1 | 5/2013 |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.

\* cited by examiner

SPACER DESIGN FOR MITIGATING STRAY LIGHT

CROSS-REFERENCE TO RELATED APPLICATIONS

This application is continuation of U.S. patent application Ser. No. 16/975,718 filed Aug. 26, 2020 (now allowed), which was a 371 application from international patent application PCT/IB2019/051643 filed Mar. 1, 2019, which claims priority from U.S. Provisional Patent Application No. 62/637,451 filed Mar. 2, 2018, which is expressly incorporated herein by reference in its entirety.

FIELD

The presently disclosed subject matter is related in general to lenses of digital cameras, including folded digital cameras.

BACKGROUND

A typical digital camera includes an image sensor (or simply "sensor") and a lens (also known as "lens assembly", or "lens module"). The lens forms an image on the sensor. A lens may include several lens elements, typically assembled in one lens barrel. Folded cameras (FCs) and double-folded cameras (DFCs) are known, see for example co-owned U.S. Pat. No. 9,392,188, which is incorporated herein by reference in its entirety.

SUMMARY

According to some examples of the presently disclosed subject matter, there are provided spacers for separating a first lens element from a second lens element, a spacer comprising a spacer perimeter including a contact section being in contact with the first lens element and the second lens element and a non-contact section being separated from the first lens element.

In addition to the above features, the spacer according to this aspect of the presently disclosed subject matter can optionally comprise one or more of features (i) to (viii) below, in any technically possible combination or permutation:
 i. wherein the non-contact section comprises a non-contact section internal inclined surface having a height D2 extending between an internal contour of the spacer to a base of the non-contact section internal inclined surface, wherein the spacer perimeter has a thickness t extending between a contact point of a back face of the spacer facing the second lens element and a contact point of a front face of the spacer facing the first lens element, and wherein an inclination of the non-contact section internal inclined surface is greater than a ratio D2/t,
 ii. wherein height D2 is perpendicular to thickness t,
 iii. wherein the contact section comprises a contact section internal inclined surface having an inclination less steep than the inclination of the non-contact section internal inclined surface,
 iv. wherein the first lens element is at an object side relative to the spacer and wherein the second lens element is at an image side relative to the spacer,
 v. wherein an optical part of the first lens element or the second lens element is non-circular,
 vi. wherein the spacer is included in a camera comprising an image sensor, wherein the non-contact section internal inclined surface is designed to redirect stray light so it does not hit the image sensor,
 vii. wherein the sensor is characterized by at least two sides, and wherein each side is characterized by a different length,
 viii. wherein the sensor is characterized by a non-circular shape.

According to some examples of the presently disclosed subject matter, there are provided lens modules comprising a plurality of lens elements ordered along a lens symmetry axis from an object side to an image side, each lens module comprising a spacer situated between a lens element and a consecutive lens element from among the plurality of lens elements, the spacer comprising along its perimeter a contact section being in contact with the first lens element and the second lens element and a non-contact section being separated from the first lens element. A spacer in such a lens module may comprise one or more of features (i) to (viii) above, in any technically possible combination or permutation.

According to some examples of the presently disclosed subject matter, there are provided digital cameras, each digital camera comprising a lens module accommodating a plurality of lens elements ordered along a lens symmetry axis from an object side to an image side and at least one spacer situated between a lens element and a consecutive lens element from among the plurality of lens elements, the spacer comprising a spacer perimeter including a contact section being in contact with the first lens element and the second lens element and a non-contact section being separated from the first lens element. A spacer in such a digital camera may comprise one or more of features (i) to (viii) above, in any technically possible combination or permutation.

BRIEF DESCRIPTION OF THE DRAWINGS

Non-limiting examples are described below with reference to figures attached hereto that are listed following this paragraph. Identical structures, elements or parts that appear in more than one figure are generally labeled with a same numeral in all the figures in which they appear. The drawings and descriptions are meant to illuminate and clarify examples of the subject matter disclosed herein, and should not be considered limiting in any way. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It is appreciated that unless explicitly set forth otherwise, terms such as "first", "second", "third" and so forth as used herein, are not necessarily meant to imply a particular order, but are only meant to distinguish between different elements or actions. For example, a first lens element and second lens element as used herein do not necessarily refer to the pair of lens elements in lens 100 disclosed herein below, which are located closest to the object side, and may refer to a different pair of lens elements located elsewhere in lens 100, e.g. second and third lens elements.

Stray light is an undesirable effect where light in an optical system. Stray light is light not intended to enter the optical system according to an optical design, but nonetheless reaches the sensor. In some cases, stray light may come from an intended source (e.g. light reflected from an object in the field of view of the camera), but follows paths other than the intended path (optical path that does not pass through the optical area of all lens elements in a lens module on its path to the sensor). In other cases, stray light may come from a source other than the intended source (e.g. outside the camera field of view (FOV)).

Figure 1A:
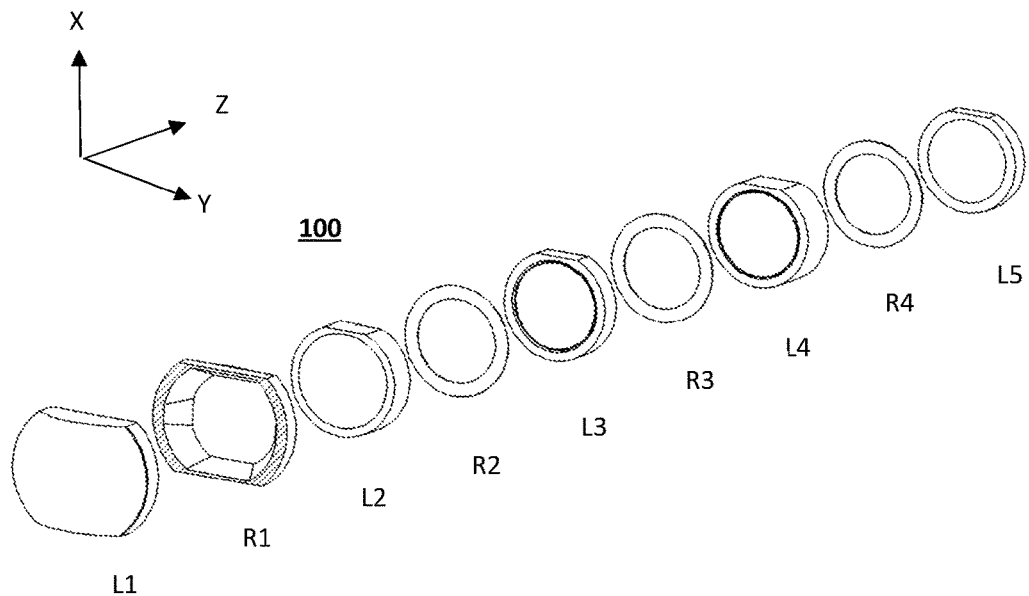
FIG. 1A shows schematically a lens in a general isometric view.
Figure 1B:
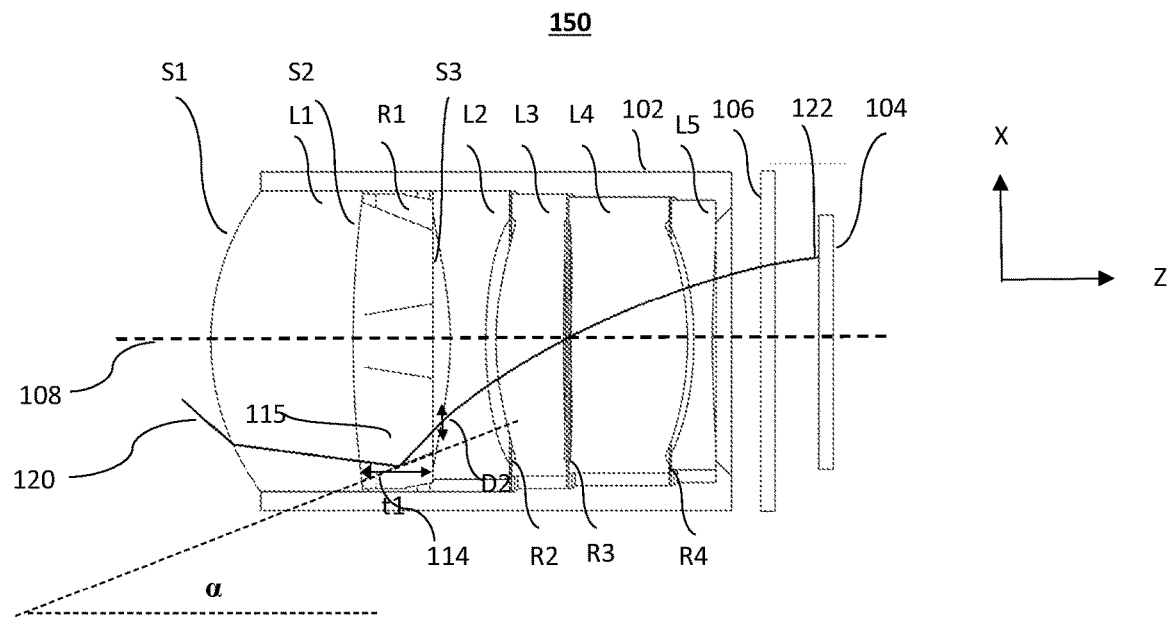
FIG. 1B shows a cut through a lens barrel carrying the lens of FIG. 1A, together with a stray light ray path through the barrel to an image sensor, according to examples of the presently disclosed subject matter.

For example, FIG. 1B shows schematically a camera 150 comprising a lens (numbered 100 in FIG. 1A) with stray light 220 reflected from an internal spacer R1 onto an image sensor 104 (as described in more detail below). FIG. 1A shows lens 100 in a general isometric view. Lens 100 includes a plurality (N) lens elements L, (wherein "i" is an integer between 1 and N) shown in a decomposed view where the different lens elements are illustrated separately. $L_1$ is the lens element closest to the object side and $L_N$ is the lens element closest to the image side, i.e. the side where the image sensor is located. In lens 100 N=5. This is however not limiting, and a different number of lens elements can be used. According to some examples, N is equal to or greater than 3. For example, N can be equal to 3, 4, 5, 6 or 7. The coordinates X-Y-Z apply in all other respective views where not marked. The lens elements are situated along an optical axis 108 that is aligned with the Z axis from object side to the sensor at the image side.

Each lens element $L_i$ comprises a respective front surface $S_{2i-1}$ (the index "2i−1" being the number of the front surface) and a respective rear surface $S_{2i}$ (the index "2i" being the number of the rear surface), where "i" is an integer between 1 and N. This numbering convention is used throughout the description. Alternatively, as indicated throughout this description, lens surfaces are marked as "$S_k$", with k running from 1 to 2N. The front surface and the rear surface can, in some cases, be aspherical. This is however not limiting. As shown in FIG. 1A, in some examples, an optical part (i.e. part utilized for light passage toward the sensor) of the first lens element L1 is non-circular, e.g. it has flat top and bottom sections.

FIG. 1B illustrates a side view of a cross section of camera 150. Camera 150 comprises lens barrel 102, wherein the lens elements Li and spacers Ri of lens 100 are situated within lens barrel 102. Camera 150 further comprises image sensor 104 and an optional optical element (e.g. an infrared filter) 106. In the example shown, two adjacent lens elements are separated by a spacer marked "$R_1$". Thus, lens elements L1 and L2 are separated by a spacer R1, lens elements L2 and L3 are separated by a spacer R2, lens elements L3 and L4 are separated by a spacer R3, and lens elements L4 and L5 are separated by a spacer R4.

As used herein the term "front surface" of each lens element or spacer refers to the surface of a lens element or spacer located closer to the entrance of the camera (camera object side) and the term "rear surface" refers to the surface of a lens element or spacer located closer to the image sensor (camera image side).

Figure 1C:
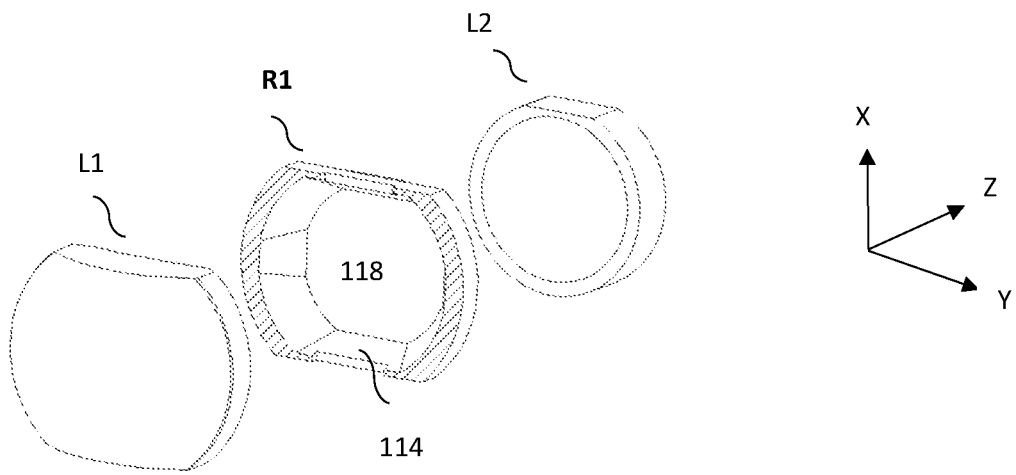
FIG. 1C shows first and second object side lens elements of the lens of FIG. 1A, separated by a spacer.
Figure 2A:
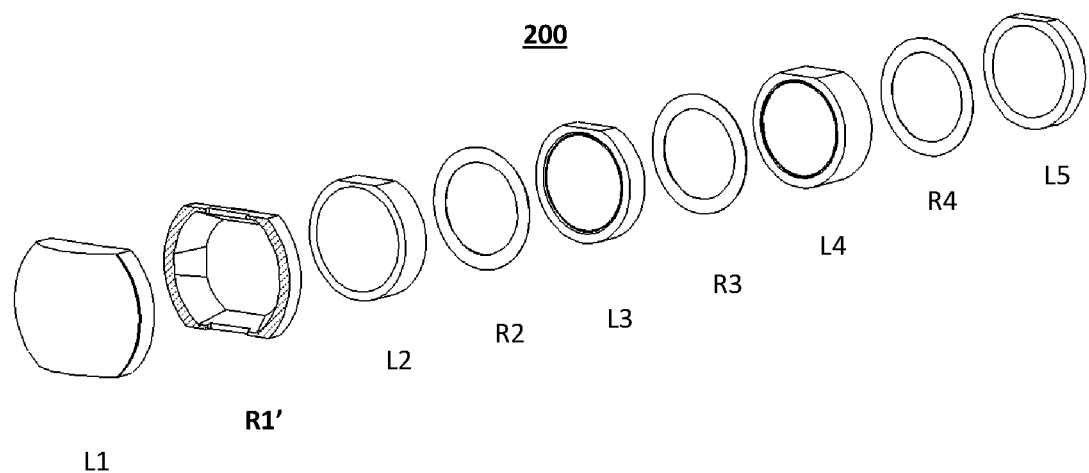
FIG. 2A shows schematically a lens in a general isometric view, according to examples of the presently disclosed subject matter.
Figure 2B:
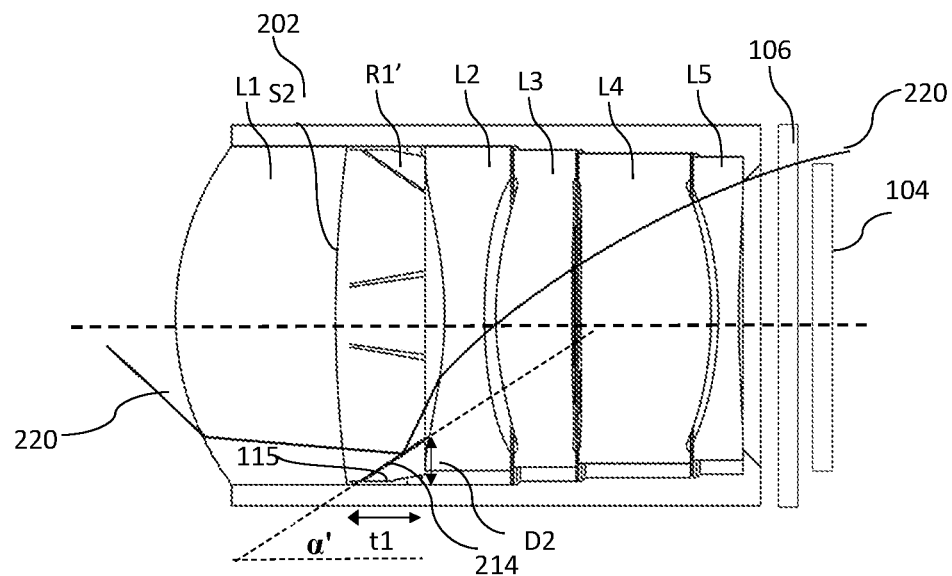
FIG. 2B shows a cut through a lens barrel carrying the lens of FIG. 2A, together with a stray light ray path through the barrel to an image sensor, according to examples of the presently disclosed subject matter
Figure 2C:
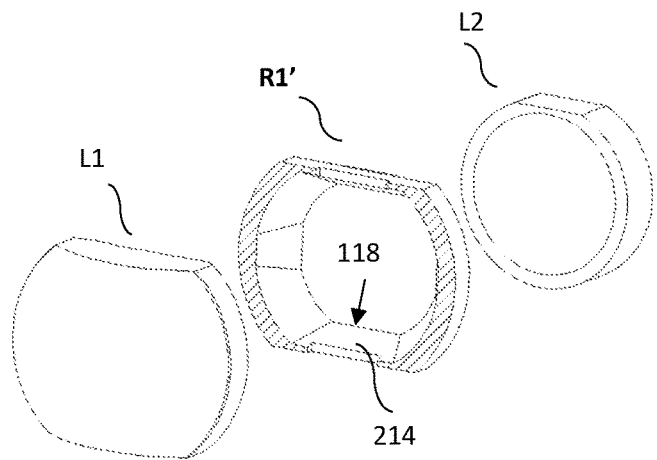
FIG. 2C shows first and second object side lens elements of the lens of FIG. 2A, separated by a spacer, according to examples of the presently disclosed subject matter.
Figure 2D:
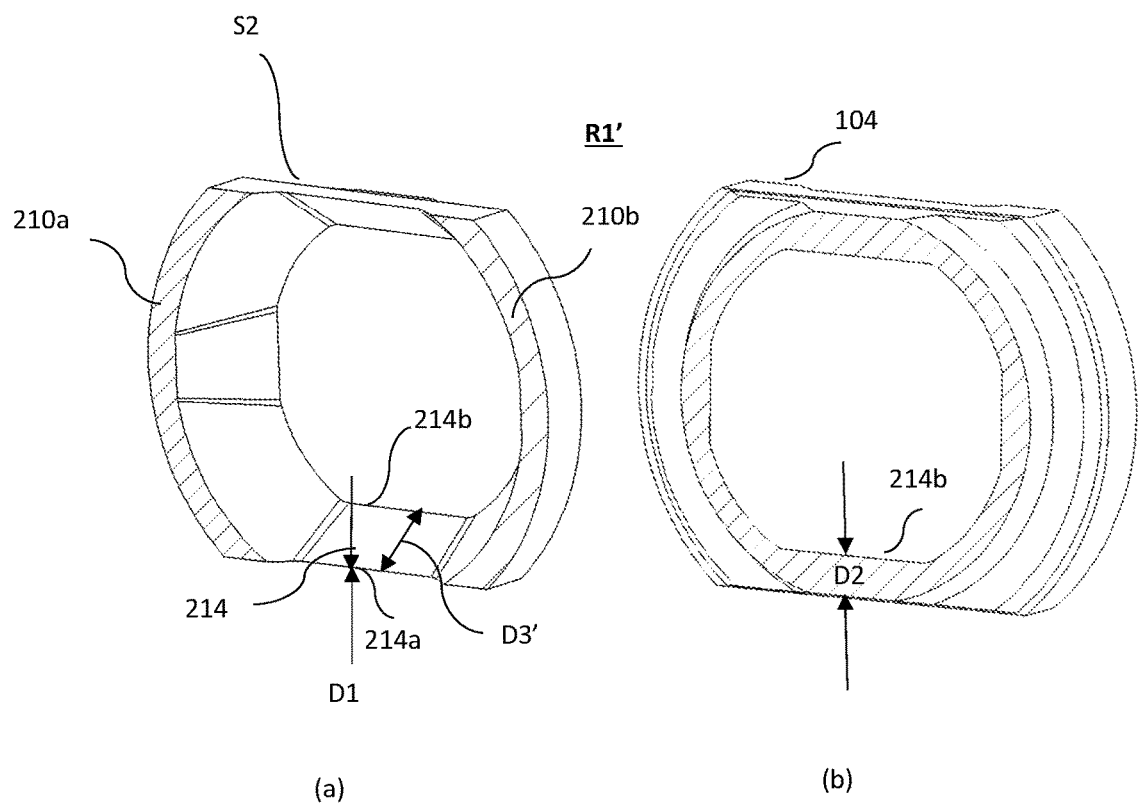
FIG. 2D shows in (a) a front, object side and in (b) a back, image side of the spacer of FIG. 2B, according to examples of the presently disclosed subject matter.

An enlarged view of lens elements L1 and L2 separated by spacer R1 is shown in FIG. 1C, and front (object side) and back (image side) views of spacer R1 are shown in FIG. 2D. Each spacer is designed to have a perimeter and an opening at its center for allowing light passage therethrough towards the sensor. The perimeter can be in contact with a first lens element at one side and a second lens element at the other side. The use of spacers in a lens assembly is known in the art.

An example of a lens design that may exhibit stray light is described with reference to FIGS. 1B and 2B. In the illustrated example, stray light 120 in camera 150 may arrive for example from reflection on internal surfaces of spacer R1 (facing an internal opening 118) and thus depends on the shape of spacer R1 (and in particular the shape of its internal surfaces). In the example shown, when assembled in the barrel, a back surface S2 of lens element L1 touches spacer R1 over entire front contact surface 110 of spacer R1, including at bottom and top front surface contact sections 110a and 110b. A front surface S3 of lens element L2 touches spacer R1 over an entire back contact surface 112 of spacer R1, including at bottom and top back surface contact sections 112a and 112b. The distance between contact points of front contact surface 110a and back contact surface 112a, along the Z axis direction, defines a spacer thickness t, which for spacer R1 is marked as t1.

Figure 1D:
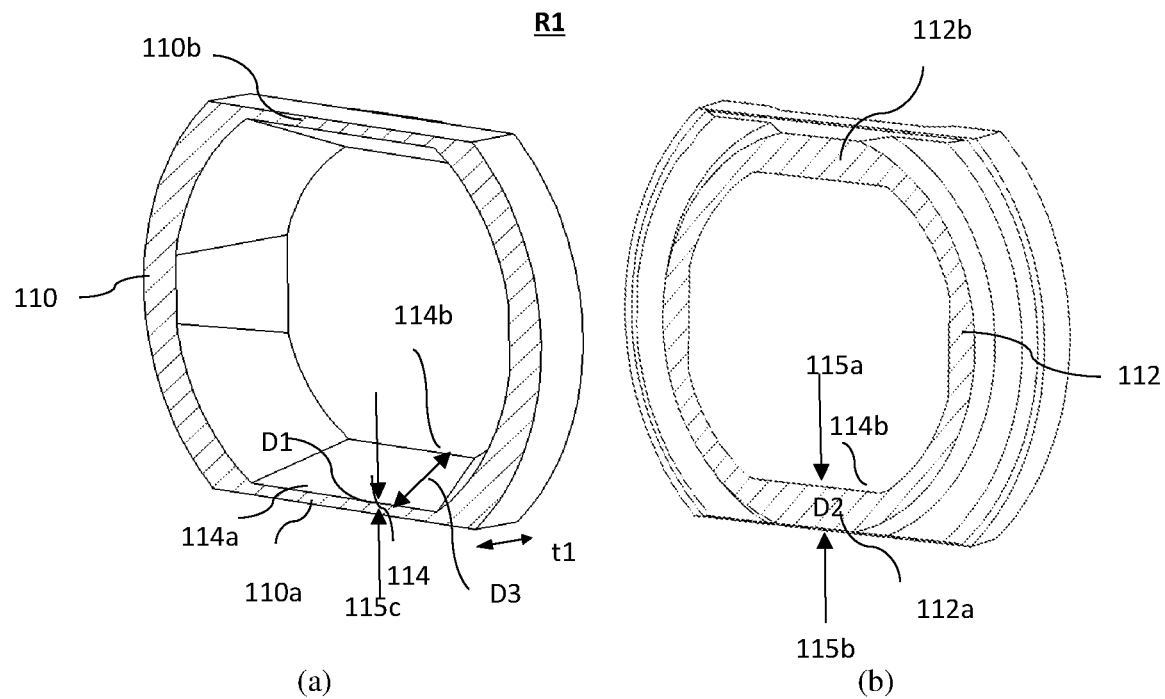
FIG. 1D shows in (a) a front, object side, and in (b) a back, image side of the spacer of FIG. 1B.

An internal surface 114 of spacer R1 between an edge 114a of a front contact section 110a and an edge 114b of a back contact section 112a has a length D3 and an inclination (angle) a. Spacer R1 has a height D2 (also shown in FIG. 1B) of back contact section 112a (substantially perpendicular to thickness t1) extending between an internal contour of the spacer (an edge of the internal opening 118 as indicated by arrow 115a in FIG. 1D) and a base 115 of the inclined surface (indicated by arrow 115b), setting the inclination (angle) a. In some cases, spacer R1 may also have a thickness D1 of front bottom contact section 110a, extending from the base 115 of the spacer in the X direction towards an external edge of the spacer (indicated by arrow 115c). Notably a similar surface 114 and thicknesses D1 and height D2 exist at the top of spacer R1 (i.e. the lens is axi-symmetric radially along axis X). In other examples, other or additional inclination surfaces similar to 114 may exist at other locations around the perimeter of the spacer. As mentioned above, inclination α is determined by spacer thickness t1 and height D2, where tan α=D2/t1.

According to the illustrated example, given the design of the first lens element L1 and angle α and as shown in FIG. 1B, a stray light ray 120 entering the lens from the object side is refracted by lens element L1, hits surface 114 of spacer R1, reflected from the surface, and continues through the lens along an optical path terminating at the image sensor 104 at a point 122.

According to the subject matter disclosed herein, it is suggested to solve the problem of stray light described above by a special spacer-design devised for this purpose. Examples of the spacer design are described with reference to FIGS. 2A-2D. FIG. 2A shows schematically a lens numbered 200 according to an example of the presently disclosed subject matter in a general isometric view. Lens 200 is shown in a decomposed view where the different lens elements are illustrated separately. FIG. 2B shows first and second object side lens elements of lens 200, separated by a spacer R1'. FIG. 2C illustrates a side view of a cross section of a camera 250. Lens 250 comprises lens barrel 202 that accommodates lens 200. Camera 250 further comprises image sensor 104 and optional optical element 106 (e.g. IR filter). FIG. 2C further illustrates a stray light ray 220 passing through the barrel in the object side direction. FIG. 2D shows in (a) a front, object side and in (b) a back, image side of the spacer of FIG. 2B.

By way of example lens 200 is shown to include five lenses, similar to lens 100. As mentioned above, this example is not meant to be limiting and a different/greater number of elements is likewise contemplated. According to an example, all the elements of lens 200 are similar to those of lens 100, except for an "improved" first spacer numbered R1' located between lens elements L1 and L2. Spacer R1' has a more steeply inclined internal surface (positive slope) 214, having an inclination angle α' greater than α, for example an angle α'=33.3°, as compared to angle α that equals about 20°. The steeper inclination is achieved in some examples, by shortening the length between edges 214a and 214b (as compared to 114a and 114b above) to obtain length of inclination D3'. In some examples the height D2 is the same as that of spacer R1. Notably, increasing the inclination angle by increasing height D2 may have an adverse effect, as it would reduce the open space at the center (opening 118) of the spacer, causing increased blockage of light passing through the lens.

Different than lens 100 described above, where contact between S2 and R1 occurs over the entire front contact surface 110, here the shorter length of D3' (relative to D3) results in no-contact sections in R1' (e.g. at the bottom and top), which are separated from surface S2 of lens L1 (i.e. section illustrated as contact sections 110a and 110b in spacer R1). Contact sections 210a and 210b, which are in contact with S2, are located adjacent to the no-contact sections. By allowing no contact between the spacer R1' and S2 at certain sections of the spacer, it is made possible to increase the inclination angle. According to the suggested design, the inclination of the internal inclined surface is greater than a ratio between height D2 and thickness t1, such that, tan α>D2/t1. As a result of the steeper inclination of the internal bottom surface 214, stray light ray 220 entering the lens from the object side is refracted by lens element L1, hits surface 214 of spacer R1' and continues through the lens along an optical path that misses image sensor 104.

The changes in lens 200 and specifically in spacer R1' as described above introduce significant design flexibility. The increased inclination of a surface such as surface 214 reduces stray light.

The example of surface 214 as a bottom and/or top surface of R1' is not limiting in any way: one, two or more such surfaces can be formed around the circumference of spacer R1' e.g. facing surface S2. In an embodiment (not shown), surface S2 may contact spacer R1' at only three points on its front contact surface, such that most of the side edges include no-contact surfaces (with steeper inclination) such as surface 214.

It is noted that while the description above refers to a non-circular lens element (having flat top and/or bottom sections), this should not be construed as limiting. According to other examples, the lens element may be circular, with a lens and/or camera including such a circular lens element still benefiting from reduction in stray light due to a spacer design as disclosed herein. The presently disclosed subject matter can be used for mitigating the stray light problem, where the problem exists in one or more sections of the perimeter of the spacer.

As explained above, stray light entering the lens from the object side is refracted by lens element L1, hits some part of the surface of the spacer, and continues through the lens along an optical path towards the sensor. Considering for example a sensor characterized by a rectangular shape, due to the difference in shape between the sensor and the lens (having a circular or substantially circular shape), stray light may hit the sensor when reflected from one side of the spacer, and may miss the sensor when reflected from another side of the spacer. Such differences may also be encountered when the sensor is characterized by sides having different lengths, such as in the case of a rectangular sensor, which is not square shaped.

A spacer (e.g. R1' located between lens elements L1 and L2) can be adapted as described above to have a more steeply inclined internal surface 214 at the sides of the spacer that reflect the stray light so it does not hit the sensor. The higher inclination can be achieved by shortening the length between edges 214a and 214b and obtaining a non-contact section D3', as mentioned above.

It is noted that a digital camera (150, 250) discussed hereinabove may be a multi-aperture camera that includes one or more additional upright cameras as well as one or more folded cameras. A folded camera comprises a reflecting element (e.g. a mirror or prism) configured to fold light incoming along a first optical path from an object side to a second optical path (substantially perpendicular to the first optical path) along the lens symmetry axis towards the sensor. An example of a folded camera is described in U.S. Pat. No. 9,392,188, which is incorporated herein by reference in its entirety.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:

1. A spacer for separating a non-circular first lens element from a second lens element, the spacer comprising:
a spacer perimeter including a contact section being in contact with the first lens element and the second lens element and a non-contact section being separated from the first lens element,
wherein the non-contact section comprises a non-contact section internal inclined surface having a height D2 extending between an internal contour of the spacer to a base of the non-contact section internal inclined surface,
wherein the spacer perimeter has a thickness t extending between a contact point of a back face of the spacer facing the second lens element and a contact point of a front face of the spacer facing the first lens element, and
wherein an inclination of the non-contact section internal inclined surface is greater than a ratio D2/t.

2. The spacer of claim 1, wherein height D2 is perpendicular to the thickness t.

3. The spacer of claim 2, wherein the contact section comprises a contact section internal inclined surface having an inclination less steep than the inclination of the non-contact section internal inclined surface.

4. The spacer of claim 1, wherein the first lens element is at an object side relative to the spacer and wherein the second lens element is at an image side relative to the spacer.

5. The spacer of claim 1, wherein an optical part of the first lens element or the second lens element is non-circular.

6. The spacer of claim 1, included in a camera comprising an image sensor, wherein the non-contact section internal inclined surface is designed to redirect stray light so it does not hit the image sensor.

7. The spacer of claim 6, wherein the sensor is characterized by having at least two sides, and wherein each side is characterized by a different length.

8. The spacer of claim 6, wherein the sensor is characterized by having a non-circular shape.

9. A lens module comprising:
a plurality of lens elements ordered along a lens symmetry axis from an object side to an image side; and
a spacer situated between a lens element and a consecutive lens element from among the plurality of lens elements, the spacer comprising along its perimeter a contact section being in contact with a first lens element and a second lens element and a non-contact section being separated from the first lens element,
wherein the non-contact section comprises a non-contact section internal inclined surface having a height D2 extending between an internal contour of the spacer to a base of the non-contact section internal inclined surface, wherein the spacer perimeter has a thickness t extending between a contact point of a back face of the spacer facing the second lens element and a contact point of a front face of the spacer facing the first lens element, and wherein an inclination of the non-contact section internal inclined surface is greater than a ratio D2/t.

10. The lens module of claim 9, wherein the height is perpendicular to the thickness.

11. The lens module of claim 9, wherein the first lens element is at an object side relative to the spacer and wherein the second lens element is at an image side relative to the spacer.

12. The lens module of claim 9, wherein an optical part of the lens element or the consecutive lens element is non-circular.

13. The lens module of claim 9, included in a camera comprising an image sensor, wherein the non-contact section internal inclined surface is designed to redirect stray light so it does not hit the image sensor.

14. The lens module of claim 13, wherein the image sensor is characterized by having at least two sides and wherein each side is characterized by a different length.

15. The lens module of claim 13, wherein the image senor is characterized by having a non-circular shape.

16. A lens module comprising:
a plurality of lens elements ordered along a lens symmetry axis from an object side to an image side; and
a spacer situated between a lens element and a consecutive lens element from among the plurality of lens elements, the spacer comprising along its perimeter a contact section being in contact with a first lens element and a second lens element and a non-contact section being separated from the first lens element,
wherein the contact section comprises a contact section internal inclined surface having an inclination less steep than the inclination of the non-contact section internal inclined surface.

17. A digital camera comprising: a lens module accommodating a plurality of lens elements ordered along a lens symmetry axis from an object side to an image side and at least one spacer situated between a lens element and a consecutive lens element from among the plurality of lens elements, the spacer comprising a spacer perimeter including a contact section being in contact with the first lens element and the second lens element and a non-contact section being separated from the first lens element,
wherein the non-contact section comprises a non-contact section internal inclined surface having a height D2 extending between an internal contour of the spacer to a base of the non-contact section internal inclined surface, wherein the spacer perimeter has a thickness t extending between a contact point of a back face of the spacer facing the second lens element and a contact point of a front face of the spacer facing the first lens element, and wherein an inclination of the non-contact section internal inclined surface is greater than a ratio D2/t.

18. The digital camera of claim 17, wherein the digital camera is a folded camera, further comprising an image sensor and a reflecting element configured to fold light incoming along a first optical path from an object side to a second optical path along the lens symmetry axis towards the image sensor.

* * * * *